US009592808B2

(12) United States Patent
Schlitzkus et al.

(10) Patent No.: US 9,592,808 B2
(45) Date of Patent: Mar. 14, 2017

(54) PUMP HOUSING FOR A MOTOR VEHICLE HYDRAULIC ASSEMBLY WITH A CONNECTION FOR A WHEEL PRESSURE SENSOR OR A MASTER BRAKE CYLINDER PRESSURE SENSOR

(71) Applicant: Robert Bosch GmbH, Stuttgart (DE)

(72) Inventors: Michael Schlitzkus, Dietmannsried (DE); Matthias Mayr, Rettenberg (DE); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 14/369,503

(22) PCT Filed: Oct. 29, 2012

(86) PCT No.: PCT/EP2012/071332
§ 371 (c)(1),
(2) Date: Jun. 27, 2014

(87) PCT Pub. No.: WO2013/097961
PCT Pub. Date: Jul. 4, 2013

(65) Prior Publication Data
US 2014/0366524 A1   Dec. 18, 2014

(30) Foreign Application Priority Data
Dec. 27, 2011   (DE) .......... 10 2011 089 915

(51) Int. Cl.
*B60T 8/34*   (2006.01)
*B60T 11/10*   (2006.01)
(Continued)

(52) U.S. Cl.
CPC ............. *B60T 11/101* (2013.01); *B60T 8/368* (2013.01); *B60T 8/3675* (2013.01);
(Continued)

(58) Field of Classification Search
CPC ................ B60T 8/3675; B60T 8/368
(Continued)

(56) References Cited

U.S. PATENT DOCUMENTS

| 6,554,375 B1 * | 4/2003 | Dinkel | B60T 8/363 |
| | | | 303/115.4 |
| 9,022,489 B2 * | 5/2015 | Weh | B60T 8/368 |
| | | | 303/119.3 |
| 2010/0276925 A1 * | 11/2010 | Bareiss | B60T 8/368 |
| | | | 285/125.1 |

FOREIGN PATENT DOCUMENTS

| DE | 10107814 A1 * | 5/2002 | ............. B60T 8/368 |
| DE | 101 45 540 A1 | 2/2003 | |

(Continued)

OTHER PUBLICATIONS

Machine translation of DE 10107814 (no date).*
(Continued)

*Primary Examiner* — Nicholas J Lane
(74) *Attorney, Agent, or Firm* — Maginot, Moore & Beck LLP (57) ABSTRACT

A pump housing has at least two inlet valve openings located in a first row, at least two outlet valve openings located in a subsequent second row, and at least one high-pressure switching valve opening and at least one changeover valve opening located in a further subsequent fourth row. At least one connection for a wheel pressure sensor is positioned in a third row between the second and fourth rows. At least one connection for a master cylinder pressure sensor is positioned in a fifth row following the fourth row.

12 Claims, 5 Drawing Sheets

(51) Int. Cl.
*B60T 8/36* (2006.01)
*B60T 11/16* (2006.01)
*B60T 11/28* (2006.01)

(52) U.S. Cl.
CPC ............. *B60T 11/165* (2013.01); *B60T 11/28* (2013.01); *Y10T 137/86485* (2015.04)

(58) Field of Classification Search
USPC .................................................. 303/DIG. 10
See application file for complete search history.

(56) References Cited

FOREIGN PATENT DOCUMENTS

| | | |
|---|---|---|
| EP | 1 707 463 A2 | 10/2006 |
| JP | 2000-177560 A | 6/2000 |
| JP | 2006-56406 A | 3/2006 |
| JP | 2010-540332 A | 12/2010 |
| WO | 2008/151919 A1 | 12/2008 |
| WO | 2009/047099 A1 | 4/2009 |

OTHER PUBLICATIONS

International Search Report corresponding to PCT Application No. PCT/EP2012/071332, mailed Nov. 1, 2013 (German and English language document) (8 pages).

\* cited by examiner

Fig. 1

Prior Art

Prior Art

PUMP HOUSING FOR A MOTOR VEHICLE HYDRAULIC ASSEMBLY WITH A CONNECTION FOR A WHEEL PRESSURE SENSOR OR A MASTER BRAKE CYLINDER PRESSURE SENSOR

This application is a 35 U.S.C. §371 National Stage Application of PCT/EP2012/071332, filed on Oct. 29, 2012, which claims the benefit of priority to Serial No. DE 10 2011 089 915.4, filed on Dec. 27, 2011 in Germany, the disclosures of which are incorporated herein by reference in their entirety.

BACKGROUND

The disclosure relates to a pump housing of a motor vehicle hydraulic assembly on which are formed at least two inlet valve openings, at least two outlet valve openings, at least one wheel pressure sensor connection, at least one high pressure switching valve opening and at least one changeover valve opening. Furthermore, the disclosure relates to a pump housing of a motor vehicle hydraulic assembly on which are formed at least two inlet valve openings, at least two outlet valve openings, at least one high pressure switching valve opening, at least one changeover valve opening and at least one master cylinder pressure sensor connection. Moreover, the disclosure relates to the use of such a pump housing on a motor vehicle hydraulic assembly.

Hydraulic assemblies are used in motor vehicles, such as e.g. automobiles or trucks, in order to provide regulated braking pressures on their brake systems. In particular, functions of an anti-lock braking system (ABS), an anti-slip regulation system (ASR) and/or of an electronic stability program (ESP) are implemented with such hydraulic assemblies. Brake pressure is generated on the brake systems by a driver of the motor vehicle using a brake pedal by means of a master cylinder or brake master cylinder. Alternatively, in ESP systems the brake pressure can be built up by the system itself. The hydraulic assemblies of said systems comprise a pump with a plurality of pump pistons and pump elements, with a motor and with a number of valves. The valves are generally electromagnetically controlled, such that different brake pressures can be provided on individual brakes or brake circuits.

In modern vehicle brake systems, wheel pressure sensors and master cylinder pressure sensors are now also used, which are used for measuring the pressures occurring on an associated wheel brake and the master cylinder. The wheel pressure sensors are required for displaying particular functions on the systems, such as e.g. a braking assistance system.

The pump housing of such a hydraulic assembly is generally essentially cuboidal or block-shaped and made of aluminum and is provided with bores for the arrangement of the components and lines.

It is an object of the disclosure to provide a motor vehicle hydraulic assembly with a pump housing, which is of more compact design and can be manufactured less expensively compared to known pump housings.

SUMMARY

The object is achieved with a pump housing of a motor vehicle hydraulic assembly on which are formed at least two inlet valve openings, at least two outlet valve openings, at least one wheel pressure sensor connection, at least one high pressure switching valve opening and at least one changeover valve opening. The at least two inlet valve openings are disposed according to the disclosure in a first line or row, the at least two outlet valve openings are disposed in a following second line or row, the at least one wheel pressure sensor connection is disposed in a further following third line or row and the at least one high pressure switching valve opening and the at least one changeover valve opening are disposed in another following fourth line or row. The arrangement of this kind leads to an overall particularly compact design of the hydraulic assembly.

Preferably, a first line from the at least one outlet valve opening to a wheel brake cylinder opening is provided on the pump housing according to the disclosure and the wheel pressure sensor connection is connected to the first line via a first line connection.

Preferably, furthermore the first line connection to the pump housing is made according to the disclosure by means of a first transverse bore formed from the side of a pump element opening.

According to the disclosure, moreover, a pump housing of a motor vehicle hydraulic assembly is provided, especially according to the type already mentioned above, on which are formed at least two inlet valve openings, at least two outlet valve openings, at least one high pressure switching valve opening, at least one changeover valve opening and at least one master cylinder pressure sensor connection, and in which the at least two inlet valve openings are disposed in a first line or row, the at least two outlet valve openings are disposed in a following second line or row, the at least one high pressure switching valve opening and the at least one changeover valve opening are disposed in another following line or row and the at least one master cylinder pressure sensor connection is disposed in yet another following line or row.

The pump housing thereby preferably comprises a second line that is led from a master cylinder connection to the at least one high pressure switching valve opening and the at least one changeover valve opening and the master cylinder pressure sensor connection is further connected to the second line via a second line connection.

The second line connection is advantageously made by means of a transverse bore formed from the side of a pump element opening.

Furthermore, two changeover valve openings are disposed between two high pressure switching valve openings in a particularly space-saving manner.

Finally, the object is also achieved by the use of such a pump housing according to the disclosure on a motor vehicle hydraulic assembly.

BRIEF DESCRIPTION OF THE DRAWINGS

An exemplary embodiment of the solution according to the disclosure is explained in detail below using the accompanying schematic figures. In the figures.

DETAILED DESCRIPTION

Figure 1:
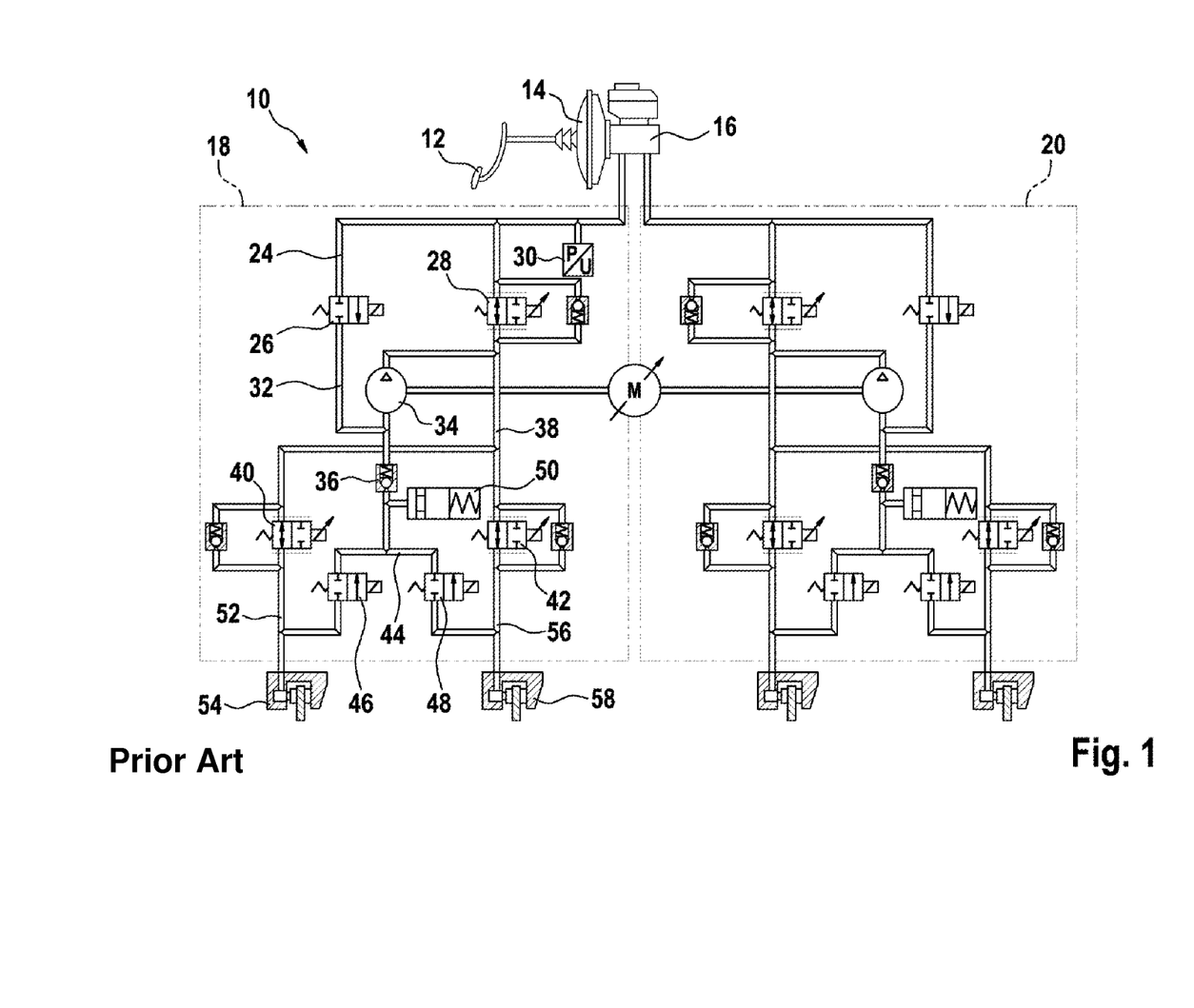
FIG. 1 shows a hydraulic plan of a vehicle brake system according to the prior art, as formed with an associated pump housing.

A vehicle brake system 10 illustrated in FIG. 1 comprises a brake pedal 12 with a brake booster 14 and a master cylinder 16 connected thereto. The master cylinder 16 is connected to two brake circuits 18 and of essentially the same design, which are essentially shown in a common pump housing 22 (see FIG. 2 ff.). Only one of said brake circuits, i.e. brake circuit 18, is explained in detail below.

For brake circuit 18 a line 24 leads from the master cylinder 16 to a high pressure switching valve 26 and a changeover valve 28. A master cylinder pressure sensor 30 is also connected to the line 24. A line 32 leads from the high pressure switching valve 26 to the suction side of a pump element 34 and to a non-return valve 36. A line 38 leads from the changeover valve 28 to the pressure side of the pump element 34 and to a first inlet valve 40 and a second inlet valve 42. A line 44 leads from the non-return valve 36 to a first outlet valve 46 and a second outlet valve 48. A reservoir 50 is also connected to the line 44. A line 52 leads from the first inlet valve 40 to a first wheel brake cylinder 54 and to the first outlet valve 46 and a line 56 leads from the second inlet valve 42 to a second wheel brake cylinder 58 and to the second outlet valve 48.

Figure 2:
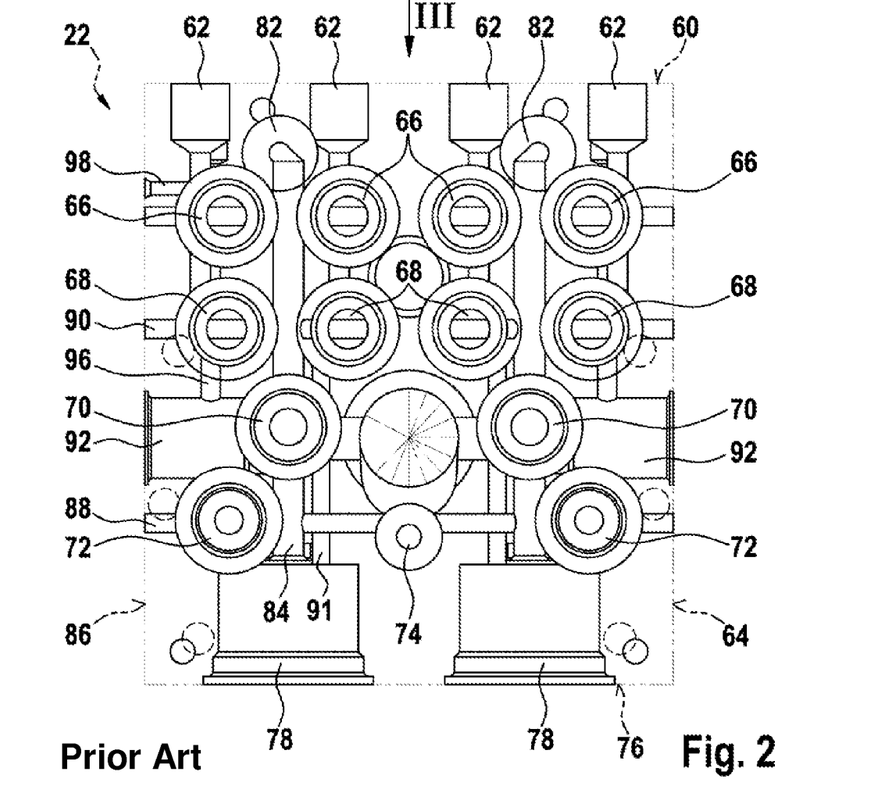
FIG. 2 shows a front view of such a pump housing according to the prior art.
Figure 3:
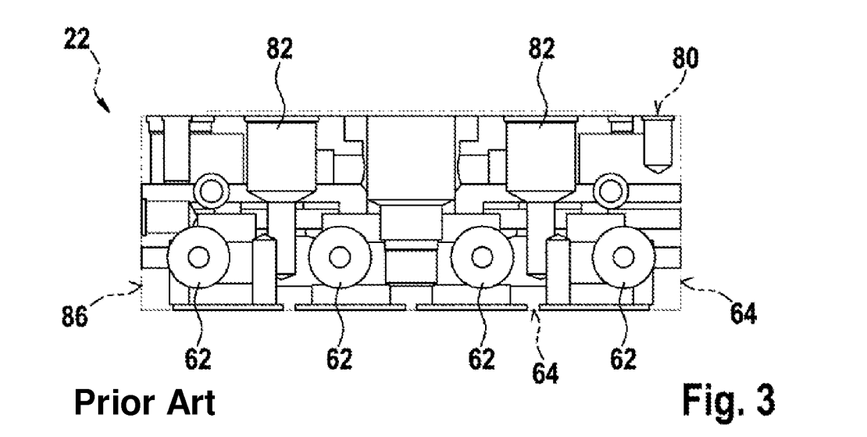
FIG. 3 shows the plan view III according to FIG. 2.
Figure 4:
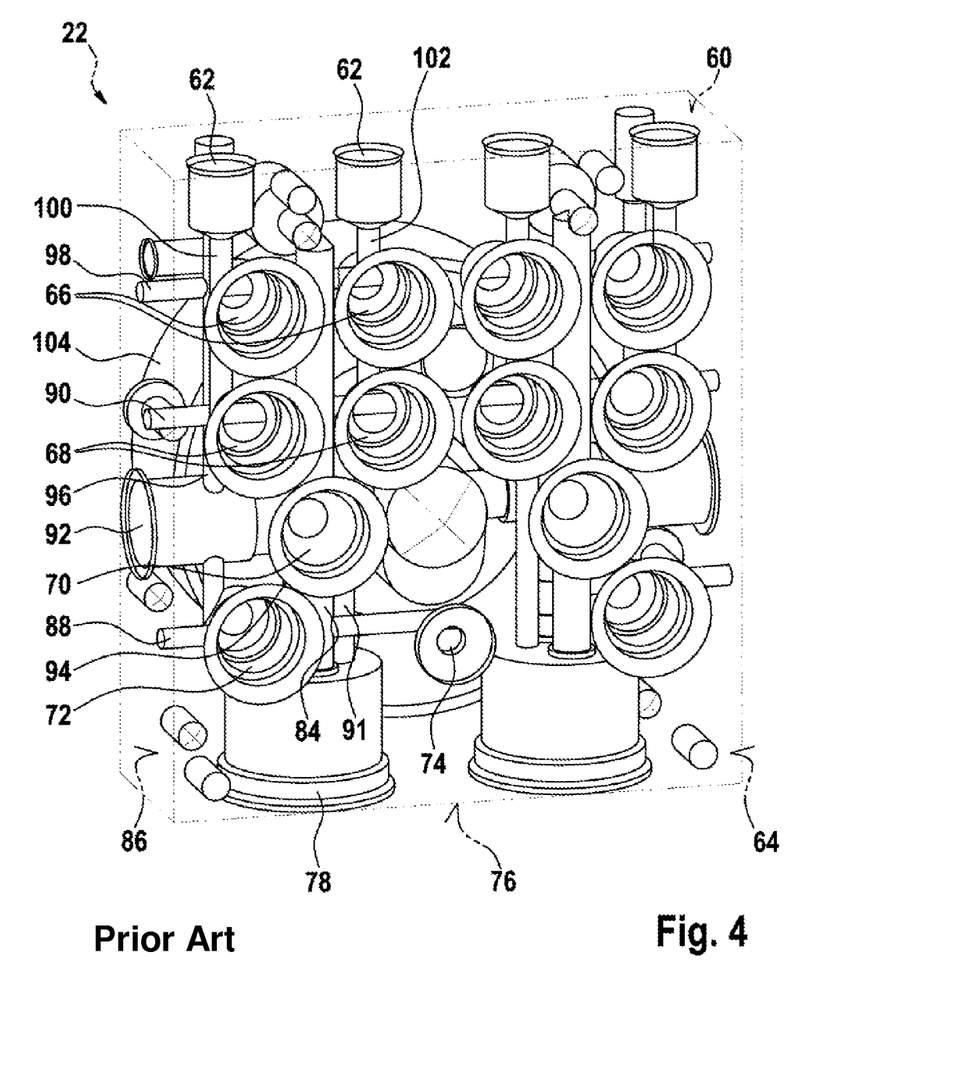
FIG. 4 shows a perspective front view of the pump housing according to FIGS. 2 and 3.

In FIGS. 2 to 4 a pump housing 22 according to the prior art is illustrated, which is essentially made from an aluminum block, in which openings are formed by means of drilling or milling. Thus on the top 60 of the aluminum block there are four wheel brake cylinder openings 62 for receiving the above-mentioned connections for the wheel brake cylinders 54 and 58 and on the front 64 of the aluminum block in a top line there are four inlet valve openings 66 for receiving the above-mentioned inlet valves 40 and 42. There are four outlet valve openings 68 for receiving the above-mentioned outlet valves 46 and 48 in a second line beneath the inlet valve openings 66. There are two high pressure switching valve openings 70 in a third line beneath the outlet valve openings 68 and in a fourth line beneath that there are two outer changeover valve openings 72 and a central master cylinder pressure sensor connection 74 for receiving an above-mentioned high pressure switching valve 26, a changeover valve 28 or the pressure sensor 30.

On the bottom 76 of the aluminum block there are two reservoir openings 78 for receiving an above-mentioned reservoir 50 and on the rear 80 there are two master cylinder connections 82. The above mentioned line 24 extends between one reservoir opening 78 and an associated master cylinder connection 82 in the form of a longitudinal bore 84 introduced into the reservoir opening 78. A transverse bore 88 to said longitudinal bore 84 formed from the left side 86 of the aluminum block connects the longitudinal bore 84 to the centrally disposed master cylinder pressure sensor connection 74. Here the transverse bore 88 extends through a changeover valve opening 72, so that this is also connected to the longitudinal bore 84. Furthermore, an outwardly directed open high pressure switching valve opening 70 also opens into the longitudinal bore 84.

Two outlet valve openings 68 are likewise connected via a transverse bore 90 and a longitudinal bore 91 to an associated reservoir opening 78 to form the above mentioned line 44. A high pressure switching valve opening 70 connected to the longitudinal bore 84 is further connected to a pump element opening 92, which is formed from the side into in the aluminum block. Furthermore, the pump element opening 92 is connected to the reservoir opening 78 via a longitudinal bore 94, in which the non-return valve 36 is disposed at the transition from the longitudinal bore 94 into the reservoir opening 78, in order to form the above mentioned line 32.

The changeover valve opening 72 connected to the transverse bore 88 is further connected by means of a longitudinal bore 96 to the pump element opening 92 and by means of another transverse bore 98 to two inlet valve openings 66, in order to form the above mentioned line 38. The above-mentioned lines 52 and 56 are finally formed by means of longitudinal bores 100 and 102, each of which is led from one of the wheel brake cylinder openings 62 to an associated inlet valve opening 66 and an outlet valve opening 68.

On the rear of such an aluminum block there is also a motor connection to an associated drive motor 104 for the pump elements 34 to be disposed in the pump element openings 92.

Figure 5:
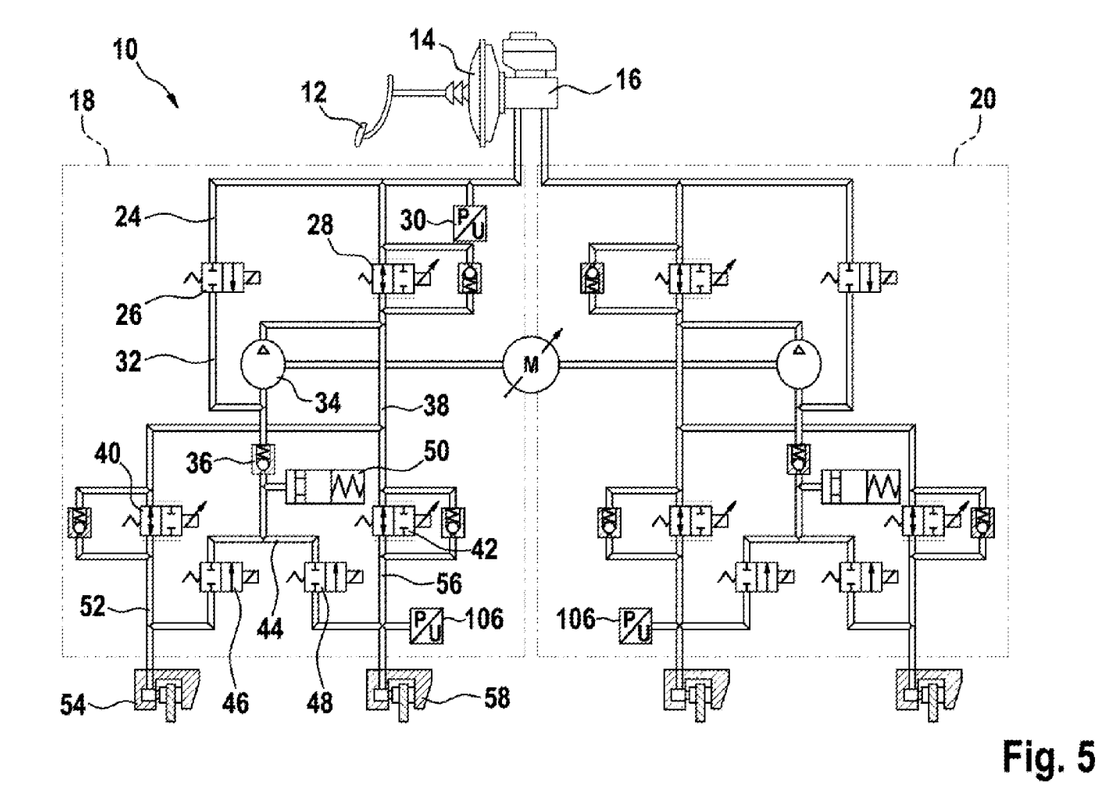
FIG. 5 shows a hydraulic diagram of a vehicle brake system according to the disclosure, as formed with an associated pump housing

In FIG. 5, the hydraulic diagram of a vehicle brake system 10 according to the disclosure is illustrated, which is constructed essentially identically to the vehicle brake system according to FIG. 1 with respect to the components 12, 14, 16 and the brake circuits 18 and 20.

In the vehicle brake system according to FIG. 5, moreover, a wheel pressure sensor 106 is hydraulically connected the line 56 of each brake circuit 18 and 20.

Figure 6:
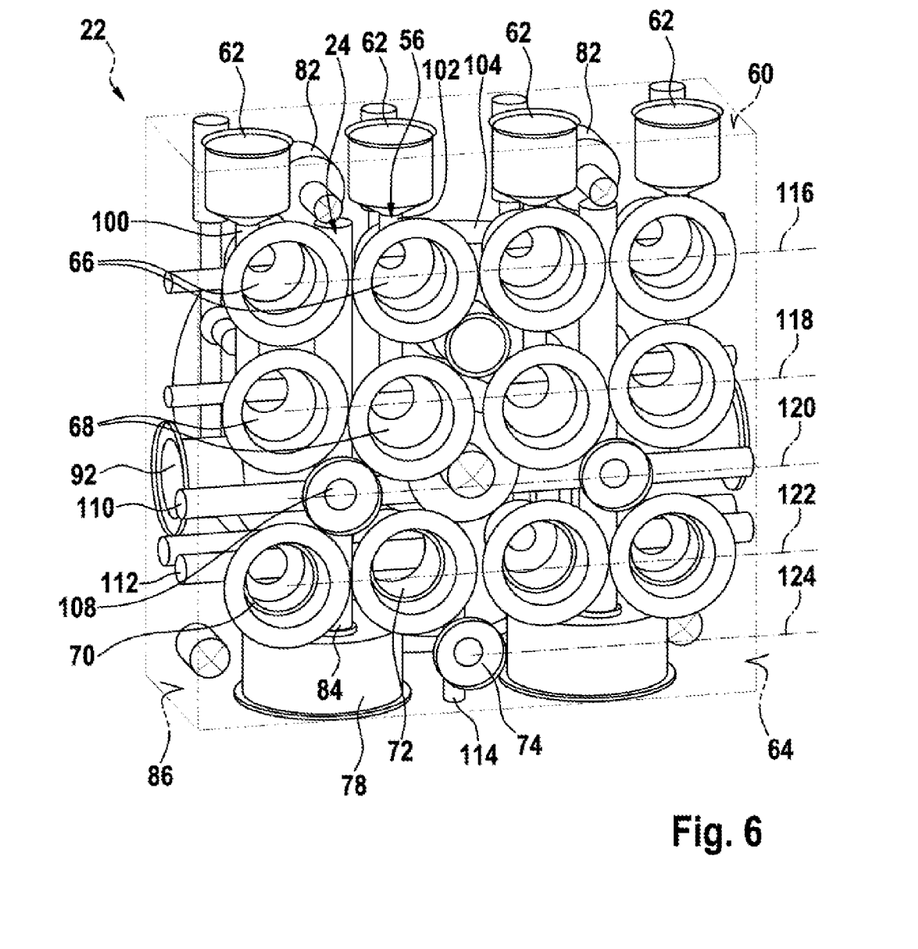
FIG. 6 shows a perspective front view of such a pump housing according to the disclosure.

FIG. 6 shows the associated pump housing according to the disclosure 22, in which likewise four wheel brake cylinder openings 62, four inlet valve openings 66, four outlet valve openings 68, two high pressure switching valve openings 70, two changeover valve openings 72, a master cylinder pressure sensor connection 74, two reservoir openings 78, two master cylinder connections 82, two pump element openings 92 and a motor connection to a drive motor 104 are provided. However, in the design of the pump housing 22 according to the disclosure the openings and the associated bores are disposed and implemented differently than according to the prior art.

Thus with the pump housing 22 according to the disclosure and according to FIG. 6, the inlet valve openings 66 are disposed in a first line 116 or row on its front 64, the outlet valve openings 68 are disposed in a second line 118 or row, two wheel pressure sensor connections 108 associated with the wheel pressure sensors 106 are disposed in a following third line 120 or row and the two high pressure switching valve openings 70 and the two changeover valve openings 72 are disposed in a further following fourth line 122 or row. The master cylinder pressure sensor connection 74 is disposed in a further following fifth line 124 or row.

The single wheel pressure sensor connection 108 opens in a transverse bore 110 that is formed from the left side 86 of the pump housing 22 next to the associated pump element opening 92. The transverse bore 110 is led up to a crossing point with the longitudinal bore 102, which leads as line 56 from one of the wheel brake cylinder openings 62 to an associated inlet valve opening 66 and an outlet valve opening 68. The transverse bore 110 thus forms a section of a first line connection between the wheel pressure sensor connection 108 and the wheel brake cylinder opening 62 associated with the longitudinal bore 102.

The two changeover valve openings 72 are disposed between the two high pressure switching valve openings 70. The single changeover valve opening 72 and the single high pressure switching valve opening 70 are each connected to the longitudinal bore 84 formed in the associated reservoir opening 78 by means of a transverse bore 112 formed from the side 86 or from the opposite side. The transverse bore 112 on the left side passes through the associated changeover valve opening 72, the associated longitudinal bore 84 and the associated high pressure switching valve opening 70 and is continued as far as the center of the pump housing 22 as a section of a second line connection. There the transverse bore 112 meets a longitudinal bore 114, which is formed from the bottom 76 and forms a further section of the second line connection as far as a crossing point with the master cylinder pressure sensor connection 74. The master cylinder pressure sensor connection 74 thereby opens directly in said longitudinal bore 114.

The invention claimed is:

1. A pump housing of a motor vehicle hydraulic assembly, comprising:
   at least two inlet valve openings disposed in a first row, each of the at least two inlet valve openings being configured to receive an inlet valve;
   at least two outlet valve openings disposed in a following second row, each of the at least two outlet valve openings being configured to receive an outlet valve;
   at least one wheel pressure sensor connection disposed in a further following third row, each of the at least one wheel pressure sensor connections being configured to receive a wheel pressure sensor;
   at least one high pressure switching valve opening disposed in a further following fourth row, each of the at least one high pressure switching valve openings being configured to receive a high pressure switching valve;
   at least one changeover valve opening disposed in the further following fourth row, each of the at least one changeover valve openings being configured to receive a changeover valve; and
   a pump element opening configured to receive a pump element, the pump element opening being defined in a first side surface of the pump housing,
   a first line extends from one of the at least two outlet valve openings to a wheel brake cylinder opening,
   the wheel pressure sensor connection is connected to the first line via a first line connection, and
   wherein the first line connection is defined by a first transverse bore formed in the first side surface transverse to the first line.

2. A pump housing of a motor vehicle hydraulic assembly, comprising:
   at least two inlet valve openings disposed in a first row, each of the at least two inlet valve openings being configured to receive an inlet valve;
   at least two outlet valve openings disposed in a following second row, each of the at least two outlet valve openings being configured to receive an outlet valve;
   at least one wheel pressure sensor connection disposed in a further following third row, each of the at least one wheel pressure sensor connections being configured to receive a wheel pressure sensor;
   at least one high pressure switching valve opening disposed in a further following fourth row, each of the at least one high pressure switching valve openings being configured to receive a high pressure switching valve;
   at least one changeover valve opening disposed in the further following fourth row, each of the at least one changeover valve openings being configured to receive a changeover valve; and
   a master cylinder-pressure sensor connection configured to receive a master cylinder pressure sensor, the master cylinder-pressure sensor connection being disposed in a further following fifth row in such a way that no portion of the master cylinder pressure sensor connection intersects a plane defined normal to an outer surface of the pump housing in which the at least one changeover valve opening is defined and extending centrally through the at least one changeover valve opening.

3. The pump housing as claimed in claim 2, wherein:
   a second line extends from a master cylinder connection to one of the at least one high pressure switching valve openings and to one of the at least one changeover valve openings; and
   the master cylinder pressure sensor connection is connected to the second line via a second line connection.

4. The pump housing as claimed in claim 3, further comprising:
   a pump element opening configured to receive a pump element, the pump element opening being defined in a first side surface of the pump housing,
   wherein the second line connection is defined by a second transverse bore formed in the first side surface transverse to the second line.

5. The pump housing as claimed in claim 2, wherein:
   a first line extends from one of the at least two outlet valve openings to a wheel brake cylinder opening; and
   the wheel pressure sensor connection is connected to the first line via a first line connection.

6. The pump housing as claimed in claim 2, wherein two changeover valve openings of the at least one changeover valve opening are disposed between two high pressure switching valve openings of the at least one high pressure switching valve opening.

7. A motor vehicle brake system, comprising:
   a pump housing that includes:
     at least two inlet valve openings disposed in a first row;
     at least two outlet valve openings disposed in a following second row;
     at least one wheel pressure sensor connection disposed in a further following third row;
     at least one high pressure switching valve opening disposed in a further following fourth row;
     at least one changeover valve opening disposed in the further following fourth row;
   at least two inlet valves, each of the at least two inlet valves being received in a corresponding one of the at least two inlet valve openings;
   at least two outlet valves, each of the at least two outlet valve openings being received in a corresponding one of the at least two outlet valve openings;
   at least one wheel pressure sensor, each of the at least one wheel pressure sensors being hydraulically connected to a corresponding one of the at least one wheel pressure sensor connections;
   at least one high pressure switching valve, each of the at least one high pressure switching valves being received in a corresponding one of the at least one high pressure switching valve openings;
   at least one changeover valve, each of the at least one changeover valves being received in a corresponding one of the at least one changeover valve openings; and
   a pump element,
   wherein:
     a first line in the pump housing extends from one of the at least two outlet valve openings to a wheel brake cylinder opening configured to connect to a wheel brake cylinder of the brake system,
     the wheel pressure sensor connection is connected to the first line via a first line connection in the pump housing, a first side surface of the pump housing defines a pump element opening in which the pump element is received, and the first line connection is defined by a first transverse bore formed in the first side surface.

8. A motor vehicle brake system, comprising:

a pump housing that includes:
- at least two inlet valve openings disposed in a first row;
- at least two outlet valve openings disposed in a following second row;
- at least one wheel pressure sensor connection disposed in a further following third row;
- at least one high pressure switching valve opening disposed in a further following fourth row;
- at least one changeover valve opening disposed in the further following fourth row; and
- a master cylinder pressure sensor connection disposed in a further following fifth row in such a way that no portion of the master cylinder pressure sensor connection intersects a plane defined normal to an outer surface of the pump housing in which the at least one changeover valve opening is defined and extending centrally through the at least one changeover valve opening;

at least two inlet valves, each of the at least two inlet valves being received in a corresponding one of the at least two inlet valve openings;

at least two outlet valves, each of the at least two outlet valve openings being received in a corresponding one of the at least two outlet valve openings;

at least one wheel pressure sensor, each of the at least one wheel pressure sensors being hydraulically connected to a corresponding one of the at least one wheel pressure sensor connections;

at least one high pressure switching valve, each of the at least one high pressure switching valves being received in a corresponding one of the at least one high pressure switching valve openings;

at least one changeover valve, each of the at least one changeover valves being received in a corresponding one of the at least one changeover valve openings; and a master cylinder pressure sensor hydraulically connected to the master cylinder pressure sensor connection.

9. The brake system as claimed in claim 8, wherein:

a second line in the pump housing extends from a master cylinder connection to one of the at least one high pressure switching valve openings and to one of the at least one changeover valve openings; and the master cylinder pressure sensor connection is connected to the second line via a second line connection in the pump housing.

10. The brake system as claimed in claim 9, further comprising:

a pump element, wherein a first side surface of the pump housing defines a pump element opening in which the pump element is received, and wherein the second line connection is defined by a second transverse bore formed in the first side surface.

11. The brake system as claimed in claim 8, wherein two changeover valve openings of the at least one changeover valve opening are disposed between two high pressure switching valve openings of the at least one high pressure switching valve opening.

12. The brake system as claimed in claim 8, wherein:

a first line in the pump housing extends from one of the at least two outlet valve openings to a wheel brake cylinder opening configured to connect to a wheel brake cylinder of the brake system; and the wheel pressure sensor connection is connected to the first line via a first line connection in the pump housing.

* * * * *